United States Patent [19]

Nagashima

[11] Patent Number: 4,681,608

[45] Date of Patent: Jul. 21, 1987

[54] SILENCING FILTER

[75] Inventor: Akira Nagashima, Kawasaki, Japan

[73] Assignee: Kioritz Corporation, Tokyo, Japan

[21] Appl. No.: 849,041

[22] Filed: Apr. 7, 1986

Related U.S. Application Data

[63] Continuation of Ser. No. 647,427, Sep. 5, 1984, abandoned.

[30] Foreign Application Priority Data

Sep. 9, 1983 [JP] Japan ............................ 58-139809

[51] Int. Cl.[4] ............................ B01D 27/08

[52] U.S. Cl. ............................ 55/276; 55/319; 55/419

[58] Field of Search ............................ 55/276, 319, 419

[56] References Cited

U.S. PATENT DOCUMENTS

| | | | |
|---|---|---|---|
| 960,564 | 6/1910 | Laughlin | 55/276 X |
| 1,783,276 | 12/1930 | Bliss | 55/276 X |
| 2,126,643 | 8/1938 | Kamrath | 55/276 X |
| 2,143,350 | 1/1939 | Kamrath | 55/276 X |
| 2,170,902 | 8/1939 | Kamrath | 55/276 X |
| 2,265,343 | 12/1941 | Bourne | 55/276 X |
| 2,316,527 | 4/1943 | Mieras | 55/276 |
| 2,904,129 | 9/1959 | McMichael | 55/419 X |
| 3,209,520 | 10/1965 | McKinlay | 55/276 |
| 3,870,486 | 3/1975 | Eriksson et al. | 55/276 |
| 3,994,067 | 11/1976 | Hazzard et al. | 55/319 X |
| 4,424,883 | 1/1984 | Musiani | 55/276 X |

FOREIGN PATENT DOCUMENTS 2750201 5/1979 Fed. Rep. of Germany ........ 55/419

OTHER PUBLICATIONS

Dollinger Corporation, Brochure on Filters, 4 pages, dated May 19, 1972.

B 502,151, U.S. published patent application, Schonberger et al., Mar. 23, 1976.

*Primary Examiner*—Robert Spitzer
*Attorney, Agent, or Firm*—Browdy and Neimark

[57] ABSTRACT

Disclosed is a silencing filter for use in a power-driven machine arranged such that the air allowed to flow-in through an air intake port provided in a machine cover is caused to flow upwards by being caused to flow from lower ends of holes formed in extended portions of a filter element to upper ends thereof, thus being carried to a space area located above the filter element; and then the air is caused to flow downwards through the filter element and then, by being passed through the inside of machine frame portions, is guided up to an air inlet port of an internal combustion engine.

7 Claims, 1 Drawing Figure

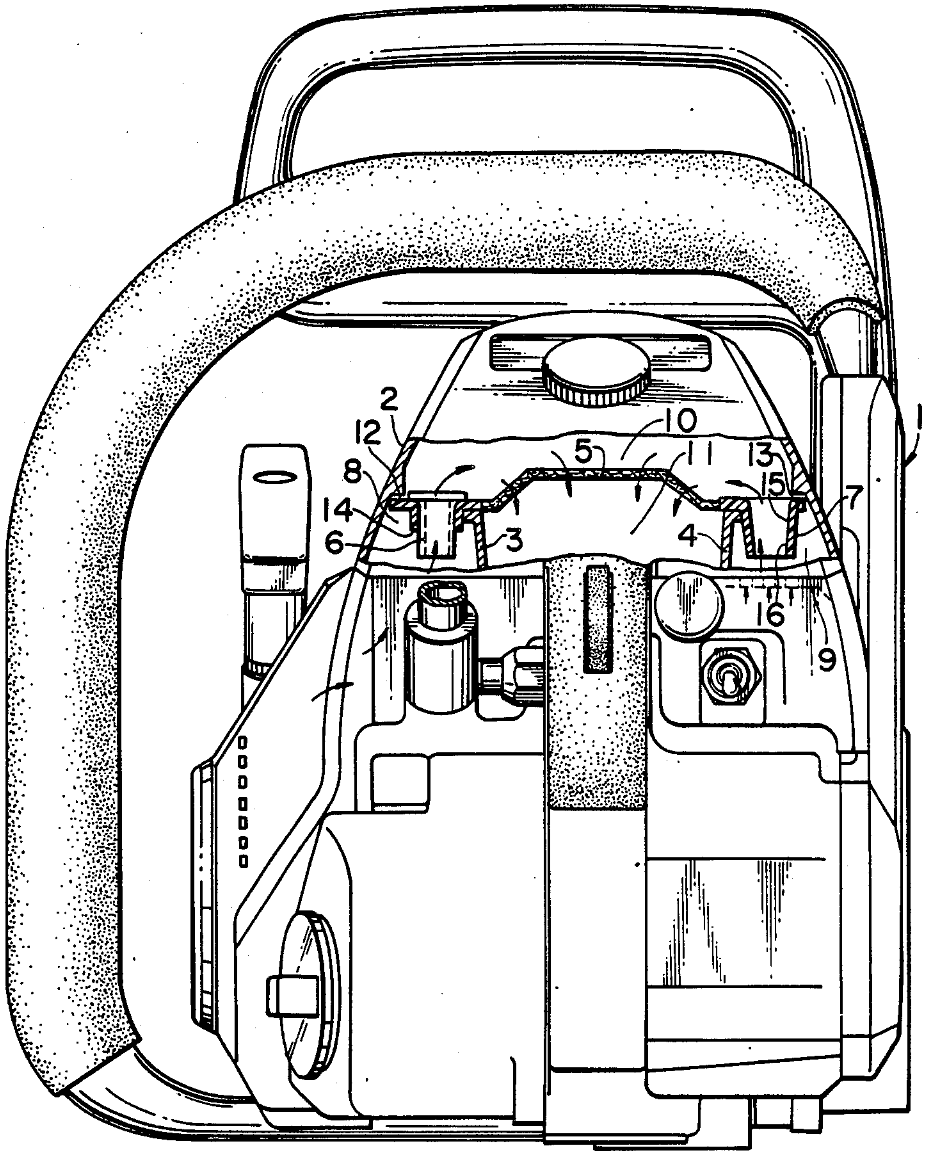
1
2
3
4
5
6
7
8
9
10
11
12
13
14
15
16

SILENCING FILTER

This is a continuation of application Ser. No. 647,427, filed 9-5-84, now abandoned.

BACKGROUND OF THE INVENTION

The present invention relates to a silencing filter for use in a power-driven machine, which is intended to clean the air supplied to an internal combustion engine incorporated thereinto as a power source.

Conventionally, this type of air filter is such that only a filter element is mounted within a machine body, or alternatively a filter element and silencing pipes are respectively independently mounted therein for the purpose of obtaining a good sucked-air silencing effect. The silencing pipes, therefore, necessitate the use of a mounting device separate from that. For this reason, not only the assembling operation but also the structure is complicated. Besides, the air filter had an additional drawback in that even relatively large pieces of dust contained in the air sucked into a cover of the machine pass through the silencing pipes and are carried into a filter-element section over a stream of air.

SUMMARY OF THE INVENTION

The object of the present invention is to provide a silencing filter for use in a power-driven machine, which eliminates the above-mentioned drawbacks inherent in the prior art silencing filter device, and which is small in number of the parts employed and easy to manufacture.

That is to say, the construction of the silencing filter according to the present invention is characterized in that it has a filter element mounted on respective upper portions of machine frame portions extending upwards in a manner to surround an air inlet of an internal combustion engine built into the machine as a power source, and extended portions integrally provided on the filter element and laterally extending over the machine frame portions toward a machine cover, whereby the air allowed to flow-in through air intake ports provided in the machine cover is caused to flow upwards by being caused to flow from lower ends of the holes formed in the extended portions to upper ends thereof, thus being carried to a space area located above the filter element; and then the air is caused to flow downwards through the filter element and then, by being passed through the inside of the machine frame portions, is guided up to the air inlet of the internal combustion engine.

According to the construction of the present invention, therefore, since the extended portions integrally provided on the filter element are formed with the air passage holes, an advantage of enabling a sucked-air silencing effect to be obtained through the action of those air passage holes is offered. Further, an advantage of enabling silencing pipes as a separate member to be very readily mounted later into the air passage hole is offered. Besides, an advantage of enabling the silencing filter to be simple in structure and manufactured at low cost is offered. Further, since the air allowed to flow into inside the machine cover is allowed first to flow upwards and then rise through the air passage holes to reach the space located above the filter element, relatively large pieces of dust contained in the air are removed at lower portions of the air passage holes and are prevented from arriving at the filter element portion. Accordingly, the silencing filter has a merit of minimizing the extent to which the filter element is strained and subjected to clogging.

BRIEF DESCRIPTION OF THE DRAWING

The drawing is a rear view, partly broken, of a chain saw which incorporates therein an example of a silencing filter according to an embodiment of the present invention.

DETAILED DESCRIPTION OF THE PREFERRED EMBODIMENT

The construction of the present invention will now be described with the use of a preferred embodiment illustrated in the drawing.

A chain saw shown generally at a numeral 1 in the drawing is covered by a cover member 2. In a space defined inside the cover member 2, an internal combustion engine (not shown) as a power source is disposed. An air passage for guiding air to a carburetor of the internal combustion engine from outside the machine is provided in the space formed inside the cover member 2.

The air passage provided inside the cover member 2 is divided into space portions 8, 9, 10 and 11 by the cover member 2, machine frame portions 3 and 4 for enclosing said carburetor, filter element 5, and extended portions 12 and 13 of this filter element 5.

The machine frame portions 3 and 4 are extended through the space formed by the cover member 2, from a lower part to an upper part. Between the upper ends of the machine frame portions 3 and 4 there is mounted the filter element 5 formed of a suitable flat-plate like member, said filter element 5 closing or defining an upper part of the space portion 11, said space portion 11 being communicated, at its lower part, with an air inlet port (not shown) of the carburetor of the internal combustion engine. The filter element 5 is integrally formed with extended portions 12 and 13 made of, for example, plastic material in such a manner that those extended portions 12 and 13 go beyond the upper end edges of the machine frame portions 3 and 4 and extend up to positions in the vicinity of inner wall surfaces, at both sides, of the cover member 2, respectively. The extended portion 12 vertically partitions off the space portion 8 from the space portion 10, while, on the other hand, the extended portion 13 partitions off the space portion 9 from the space portion 10. The space portion 11 is partitioned off from the space portion 10, vertically, by a main-body section of the filter element 5. The space portion 11 is also partitioned off from the space portion 8 and from the space portion 9 by the machine frame portions 3 and 4, respectively. Accordingly, the space portions 8, 9 and 11 are formed in such a manner as to be laterally arranged, and the space portion 10 is formed over the lateral arrangement of these space portions 8, 9 and 11.

The filter element 5 is formed as shown in the drawing. That is to say, a central part of its main-body section is allowed to rise upwards. The extended portion 12 is formed with a hole 14 having a specified length and, in the illustrated example, a silencing pipe 6 as a separate member is inserted thereinto for the purpose of obtaining a better sucked-air silencing effect. The space portion 8 and the space portion 10 are allowed to communicate with each other through an internal passage constituted by the interior of the silencing pipe 6.

The extended portion 13 of the filter element 5 may be formed in the same manner as that in which said extended portion 12 is formed. However, the extended portion 13 can be formed as another embodiment, as follows. That is, a hole 15 is formed and this hole 15 is extended downwards and integrally formed with a silencing pipe 7. An internal passage 16 of the silencing pipe 7 is disposed in match with the hole 15 so as to form one vertically continuous passage permitting the communication of the space portion 9 with the space portion 10. The inner peripheral surface of the hole 15 and passage 16 has a vertical section which gradually increases in diameter from a lower end of the passage 16 of the silencing pipe 7 toward an upper end of the extended portion 13 of the filter element 5.

The air enters the space portions 8 and 9 formed inside the cover member 2, from the air intake ports (not shown) provided in both sides of the cover member 2, respectively. Then, the air flows upwards through those space portions 8 and 9 to reach the lower ends of the silencing pipes 6 and 7 flows upwards through the internal passages of the silencing pipes 6 and 7, and thus flows into the space portion 10 while the noises generated due to fluctuations in flow of the air are decreased by the silencing action of the silencing pipes 7. Since, in this way, the flow of air flowing into the space portion 10 through the space portions 8 and 9 is pointed upwards, relatively large pieces of dust contained in the air are removed when it enters the space portion 10 by passing through the silencing pipes 6 and 7.

The air which has entered the space portion 10 is finally cleaned by being passed through the main-body section of the filter element 5, and is carried into the space portion 11 and allowed to flow downwards and thus is introduced into the air inlet port of the carburetor of the internal combustion engine.

The silencing pipes 6 and 7 according to this embodiment can be provided two or more in suitable number and the length thereof can be selectively set at a suitable value. Further, the silencing pipe 6, which can be added later as a separate member, has its internal passage made into a configuration whose vertical section gradually increases in diameter from its lower end, i.e., its upstream side toward its upper end, i.e., its downstream side as in the case of the internal passage of the silencing pipe 7. In this way, the silencing filter of the invention can be modified into various suitable forms according to the type of the machine.

What is claimed is:

1. A power driven machine comprising a machine frame including an exterior wall and a pair of upwardly extending filter support walls (3,4) defining therebetween a pair of air inlet chambers (8,9) and a central clean-air chamber (11) leading to an internal combustion engine;

a generally horizontal filter element extending across said machine and supported by said upwardly extending filter support walls, said filter element defining an upper air chamber (10) overlying the central clean-air and air inlet chambers, and said filter element including a porous air-filtering section between the upper air chamber and the clean-air chamber;

and an insertable and replaceable elongated silencing pipe (6) providing an air passageway between the air inlet chambers and the upper air chamber, said silencing pipe having an upper end terminating at approximately the level of said filter element so that said silencing pipe does not extend substantially into the upper air chamber;

whereby air flowing in through an air inlet port is caused to flow upwardly through the air inlet chambers and upwardly through the silencing pipes into the upper air chamber and then downwardly through the porous air-filtering section of said filter element into the central clean-air chamber to the internal combustion engine.

2. A power driven machine according to claim 1 wherein said porous air-filtering section of said filter element as an inverted dish-shape.

3. A power driven machine according to claim 1 further comprising a second elongated silencing pipe providing an air passageway between the air inlet chambers and the upper chamber, said second silencing pipe being unitary with said filter element, and said second silencing pipe having an upper end terminating at approximately the level of said filter element so that said second silencing pipe does not extend substantially into the upper air chamber.

4. A power driven machine according to claim 1 further comprising a second elongated silencing pipe providing an air passageway between said air inlet chambers and the upper air chamber, said second silencing pipe being an insertable and replaceable element retained in an aperture within said filter element, and said second silencing pipe having an upper end terminating at approximately the level of said filter element so that said second silencing pipe does not extend substantially into the upper air chamber.

5. A power driven machine comprising a machine frame including an exterior wall and a pair of upwardly extending filter support walls (3,4) defining therebetween a pair of air inlet chambers (8,9) and a central clean-air chamber (11) leading to an internal combustion engine;

a generally horizontal filter element extending across said machine and supported by said upwardly extending filter support walls, said filter element defining an upper air chamber (10) overlying the central clean-air and air inlet chambers, and said filter element including a porous air-filtering section between the upper air chamber and the clean-air chamber;

said filter element including a pair of side portions for supporting upper ends of elongated silencing pipes (6,7) providing air passageways between the air inlet chambers and the upper air chamber, one said silencing pipe being supported in each said side portion of said filter elements and extending downwardly from its upper supported end into one of the air inlet chambers;

whereby air flowing in through an air inlet port is caused to flow upwardly through the air inlet chambers and upwardly through the silencing pipes into the upper air chamber and then downwardly through the porous air-filtering section of said filter element into the central clean-air chamber to the internal combustion engine.

6. A power driven machine according to claim 5 wherein said silencing pipes are separate elements retained in apertures within the side portions of said filter element, each said silencing pipe having a flange at its upper end for resting on the upper surface of a side portion of said filter element.

7. A power driven machine comprising a machine frame including an exterior wall and a pair of upwardly extending filter support walls defining therebetween a pair of air inlet chambers and a central clean-air chamber leading to an internal combustion engine;

a generally horizontal filter element extending across said machine and supported by said upwardly extending filter support walls said filter element defining an upper air chamber overlying the central clean-air chamber and air inlet chambers and said filter element including a porous air-filtering section between the upper air chamber and the clean-air chamber and also including extending portions between the upper air chamber and the inlet chambers; and elongated silencing pipes integral with said extended portions of said filter element, said elongated silencing pipes each having an upper end terminating at approximately the level of said filter element and a lower end extending downwardly into one of said air inlet chambers, said elongated silencing pipes providing air passage ways between the air inlet chambers and the upper air chamber;

whereby air flowing in through an air inlet port is caused to flow upwardly through the air inlet chambers and upwardly through the silencing pipes into the upper air chamber and then downwardly through the porous air-filtering section of said filter element into the central clean-air chamber to the internal combustion engine.

* * * * *